United States Patent [19]

Libert

[11] Patent Number: 4,842,636
[45] Date of Patent: Jun. 27, 1989

[54] HYDRAULIC INVERT/NECKRING MECHANISM

[75] Inventor: Harold C. Libert, Union City, Ind.

[73] Assignee: Maul Technology Co., Winchester, Ind.

[21] Appl. No.: 104,636

[22] Filed: Oct. 2, 1987

[51] Int. Cl.$^4$ .......................... C03B 9/16; C03B 9/40
[52] U.S. Cl. ........................ 65/232; 65/235; 65/236; 65/241; 65/260; 92/31; 92/33
[58] Field of Search ................ 65/232, 235, 236, 241, 65/260; 92/31, 33

[56] References Cited

U.S. PATENT DOCUMENTS

| | | | |
|---|---|---|---|
| 2,702,444 | 2/1955 | Rowe | 65/167 |
| 2,806,449 | 9/1957 | Simmons | 121/38 X |
| 2,918,799 | 3/1988 | Geyer | 92/33 X |
| 3,024,571 | 3/1962 | Abbott et al. | 65/235 |
| 3,233,999 | 2/1966 | Mumford | 65/235 |
| 3,573,027 | 5/1968 | Nuzum, Sr. | 65/235 |
| 3,617,233 | 11/1971 | Mumford | 65/307 |
| 4,004,906 | 1/1977 | Rowe | 65/239 |
| 4,533,377 | 8/1985 | Libert | 65/232 |
| 4,637,827 | 1/1987 | Nebelung et al. | 65/235 |
| 4,652,291 | 3/1987 | Hirt | 65/68 |

Primary Examiner—Arthur Kellogg
Attorney, Agent, or Firm—Woodard, Emhardt, Naughton, Moriarty & McNett

[57] ABSTRACT

An invert/neckring mechanism for an individual section (I.S.) glass forming machine including a rectangular shaft and a pair of neckring arm holders having a central passage which mates with the rectangular cross-sectional shaft to limit the movement between the shaft and the arm holders to axial movement all rotated through the invert arc by a hydraulic actuator in juxtaposition therewith. A plurality of springs bias the arm holders together to a closed position and a hydraulic double piston cylinder assembly is mounted adjacent to the shaft between the arm holders to open and close the arm holders.

20 Claims, 4 Drawing Sheets

HYDRAULIC INVERT/NECKRING MECHANISM

FIELD OF THE INVENTION:

The present invention relates to the field of glass making machines, and in particular to a hydraulic invert/neckring mechanism in an individual section glass forming machine.

BACKGROUND OF THE INVENTION

In a conventional individual section (I.S.) glass forming machine, there are provided a plurality of individually operable sections, each section having a blank mold station and a blow mold station. At a blank mold station, a molten glass gob is forced upwards by a plunger through a split neck mold and around the plunger. The plunger is withdrawn and a charge of air is forced into the depression left by the plunger, forming an inverted parison. A neckring mechanism holding the split neck mold rotates 180°, transferring the parison from the blank mold station to the blow mold station. In the process, the parison is inverted 180° with the mouth of the now hanging parison being supported by the neck mold. A pair of blow mold halves next firmly grasps and holds the parison, allowing the neckring mechanism to separate the neck mold halves from the parison and rotate them back 180° to the blank mold station to repeat the cycle. A more detailed description of an I.S. glass forming machine is provided in U.S. Pat. No. 2,702,444 issued to Rowe.

Conventional neckring mechanisms such as those disclosed in Rowe and in U.S. Pat. No. 3,233,999 issued to Mumford and U.S. Pat. No. 3,024,571 issued to Abbott et al. include a horizontal shaft which is oscillated 180° by a rack and pinion assembly. A pair of neckring holder arms are attached to cylinders which surround the shaft and which slide telescopically along the shaft between open (apart) and closed (together) positions. The cylinders are moved between the open and closed positions by piston assemblies which are coaxial with and integrally operable with the horizontal shaft. Both the horizontal shaft and the surrounding cylinders are splined for mutual engagement and rotation as a unit about the axis of the shaft.

The problems with these and similar types of neckring mechanisms are many. Pitch line misalignment of the cylinders is a recurring problem due to backlash between the cylinders and the shaft. Adjustment too tight causes increased wear which results in backlash and further misalignment of the neck molds. Adjustment too loose also results in backlash. Further, the splined shaft and splined cylinders are ineffective at sealing the pneumatic piston assemblies from air leakage which may result in the neck molds not opening completely. This causes increased wear, pneumatic inefficiency and overall poor performance of the neckring mechanism. Moreover, splined shafts and cylinders are expensive both to manufacture and to maintain.

SUMMARY OF THE INVENTION

Generally speaking, there is provided an invert/neckring mechanism for an individual section (I.S.) glass forming machine which exhibits less risk of misalignment, is more compact and is less expensive to make, maintain and operate than current devices. In one embodiment, an invert/neckring mechanism has a horizontal shaft with a rectangular cross-section and is mounted in a frame for oscillation about its axis through 180°. A pair of neckring arm holders define sleeves which surround and mesh with the horizontal shaft, permitting the arm holders to move only axially relative to the shaft. The arm holders are biased towards each other by a plurality of springs. A double piston, hydraulic cylinder assembly, mounted adjacent the shaft and between the arm holders, urges the arm holders apart.

It is an object of the present invention to provide an improved mechanism for both inverting the parison and for gripping and releasing the neckrings which hold the parison.

It is another object of the present invention to provide an invert/neckring mechanism which is more compact than those presently in use without a corresponding loss of operability.

It is a further object of the present invention to provide an invert/neckring mechanism which is hydraulically actuated.

Related objects and advantages of the present invention will be apparent from the following description.

DESCRIPTION OF THE PREFERRED EMBODIMENT

Figure 1:
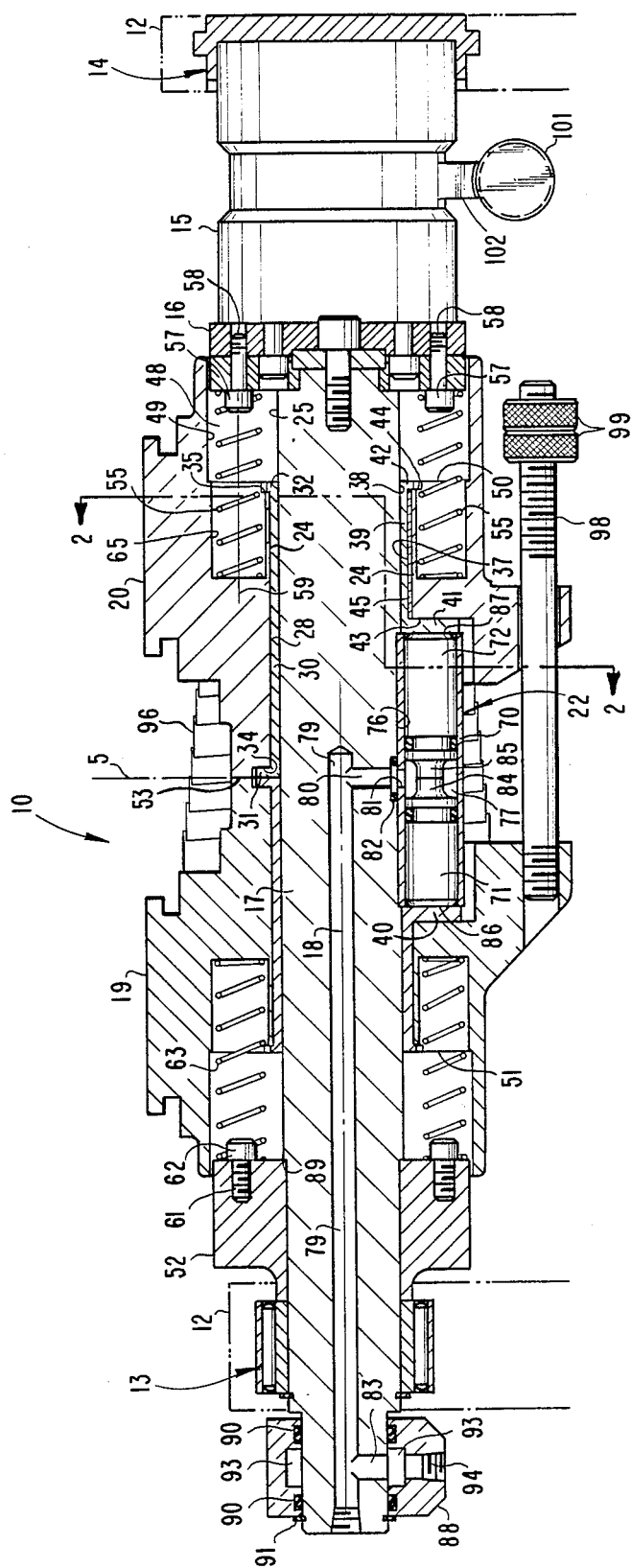
FIG. 1 is a top cross-sectional view of the invert/neckring mechanism in accordance with one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, there is shown a hydraulic invert/neckring mechanism 10 in accordance with one embodiment of the present invention. Mechanism 10 includes horizontal shaft 17, left and right neckring arm holders 19 and 20 and hydraulic cylinder assembly 22. Shaft 17 is supported at one end in a frame 12 by a conventional bearing assembly generated indicated at 13. At its other end, shaft 17 is rigidly connected to 180° hydraulic actuator assembly 15 by connector flange combination 16, assembly 15 being supported by frame 12 by a conventional bearing assembly generally indicated at 14. Actuator assemblies such as the one indicated at 15 are well known in the industry and may be one of several types such as helical spline or oscillating vane.

The major components of mechanism 10 are symmetrical about a central plane 5 which is located between arm holders 19 and 20 and which is normal to axis 18 of shaft 17. Description of mechanism 10 will generally refer to only one side of central plane 5, it being understood to apply equally to the other side except where specified.

Figure 2:
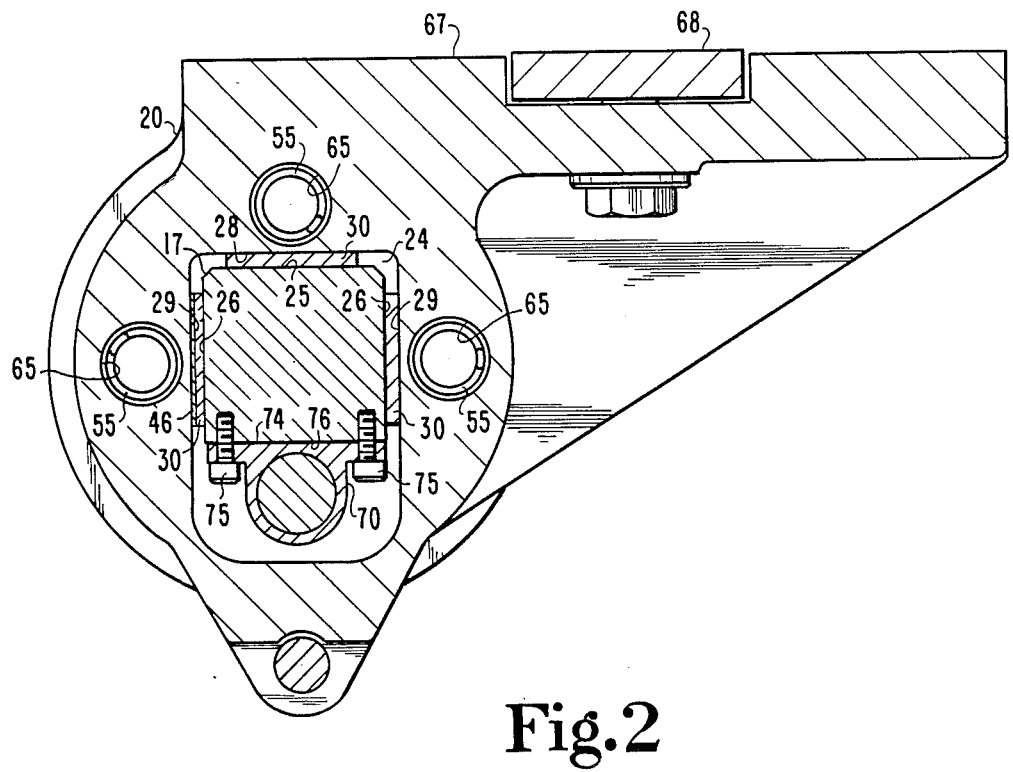
FIG. 2 is a cross-sectional view of the invert/neckring mechanism of FIG. 1 taken along the lines 2—2.

Referring to both FIGS. 1 and 2, neckring arm holder 20 is mounted to shaft 17 for axial sliding engagement therewith. Instead of the splined shaft and splined cylinders of the prior art devices, shaft 17 has a substantially rectangular cross-section along the majority of its length and arm holder 20 has a central passage 24 which defines a mating rectangular cross-sectional portion. Central passage 24 is defined by top surface 28, side surfaces 29 and bottom surface 37 (the latter shown in FIG. 1 only), all of which cooperate with shaft 17 to cause shaft 17 and arm holder 20 to mesh and rotate as a unit about axis 18. Disposed between top face 25 of shaft 17 and top surface 28 of passage 24 and between side faces 26 of shaft 17 and side surfaces 29 of passage 24 are long shoes 30 which permit sliding movement between shaft 17 and arm holder 20. At the ends of each long shoe 30 are outwardly extending flanges 31 and 32 which fit snugly within shoulders 34 and 35 of arm holder 20 and which cause shoes 30 to slide as a unit with arm holder 20 along top and side surfaces 25 and 26 of shaft 17.

To accommodate hydraulic cylinder assembly 22, which will be described in greater detail herein, bottom surface 37 of central passage 24 is shorter than top and side surfaces 28 and 29. Disposed between bottom face 38 of shaft 17 and bottom surface 37 of arm holder 20 is short shoe 39. Outwardly extending flanges 41 and 42 of short shoe 39 fit snugly within shoulders 43 and 44 of arm holder 20 to keep short shoe 39 stationary relative to arm holder 20. Shoulder 43 is sized to receive one end of hydraulic cylinder assembly 22. To compensate for manufacturing tolerances and component wear, short adjusting shim 45 is disposed between short shoe 39 and bottom surface 37 and between flanges 41 and 42. A similar long adjusting shim 46 (FIG. 2) is positioned for horizontal adjustment between one side surface 29 and its corresponding long shoe 30 and between flanges 31 and 32 of that long shoe 30.

Central passage 24 of arm holder 20 opens into cavity 48 (FIG. 1) which is defined inwardly by top, bottom and side surfaces 25, 37 and 26, respectively, of shaft 17 and outwardly by interior cylindrically surface 49 of arm holder 20. Annular surface 50 of arm holder 20, which is normal to axis 18, defines one end of cavity 48 with flange combination 16 defining the other end. Interior cylindrically surface 49 is sized just large enough to telescopically receive combination flange 16 therewithin.

Figure 3:
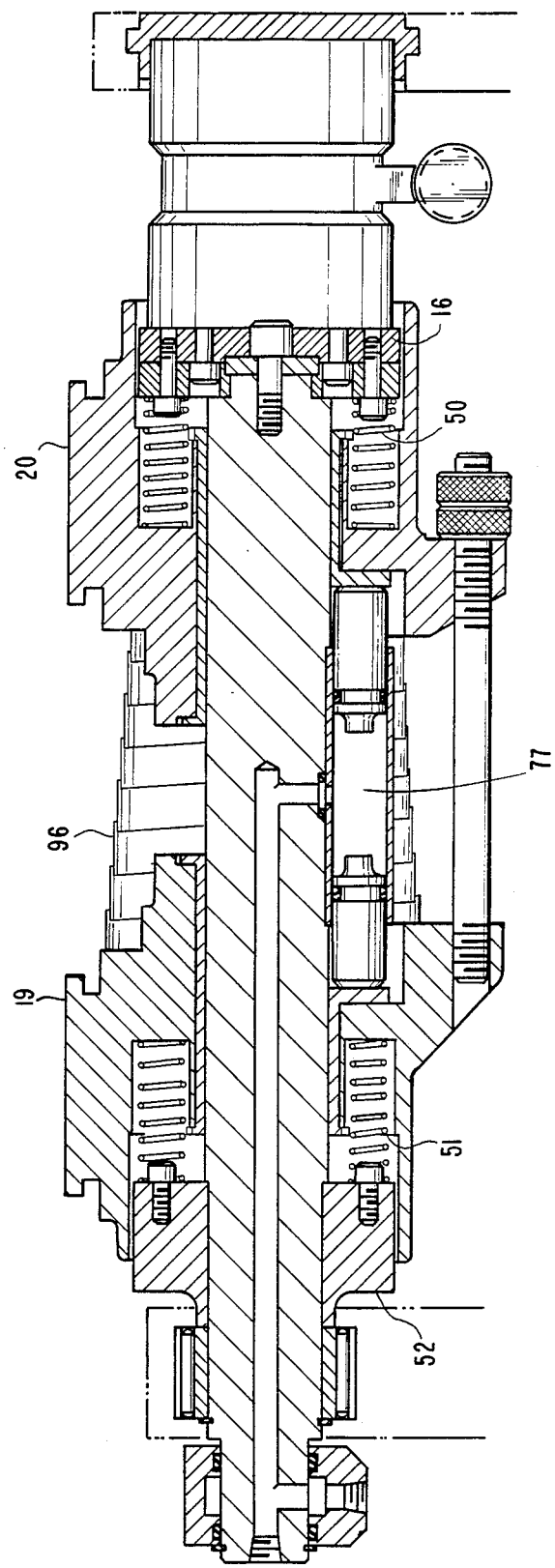
FIG. 3 is a top cross-sectional view of the invert/neckring mechanism of FIG. 1 shown with the arm holders in the open position.

The above described arrangement permits arm holder 20 (and likewise arm holder 19 disposed symmetrically about central plane 5) to slide parallel to axis 18 and along shaft 17 between open and closed positions. The closed position is defined by arm holders 19 and 20 brought together with their mutually facing surfaces 53 in contact with each other at points all lying within central plane 5. (FIG. 1) The open position is defined by arm holders 19 and 20 being apart from each other along shaft 17 and with annular surface 50 of arm holder 20 disposed against or very near combination flange 16. (FIG. 3) The counterpart of combination flange 16 on the other side of plane 5 is stop 52. In the open position, annular surface 51 of arm holder 19 is thus disposed against or very near stop 52.

Figure 4:
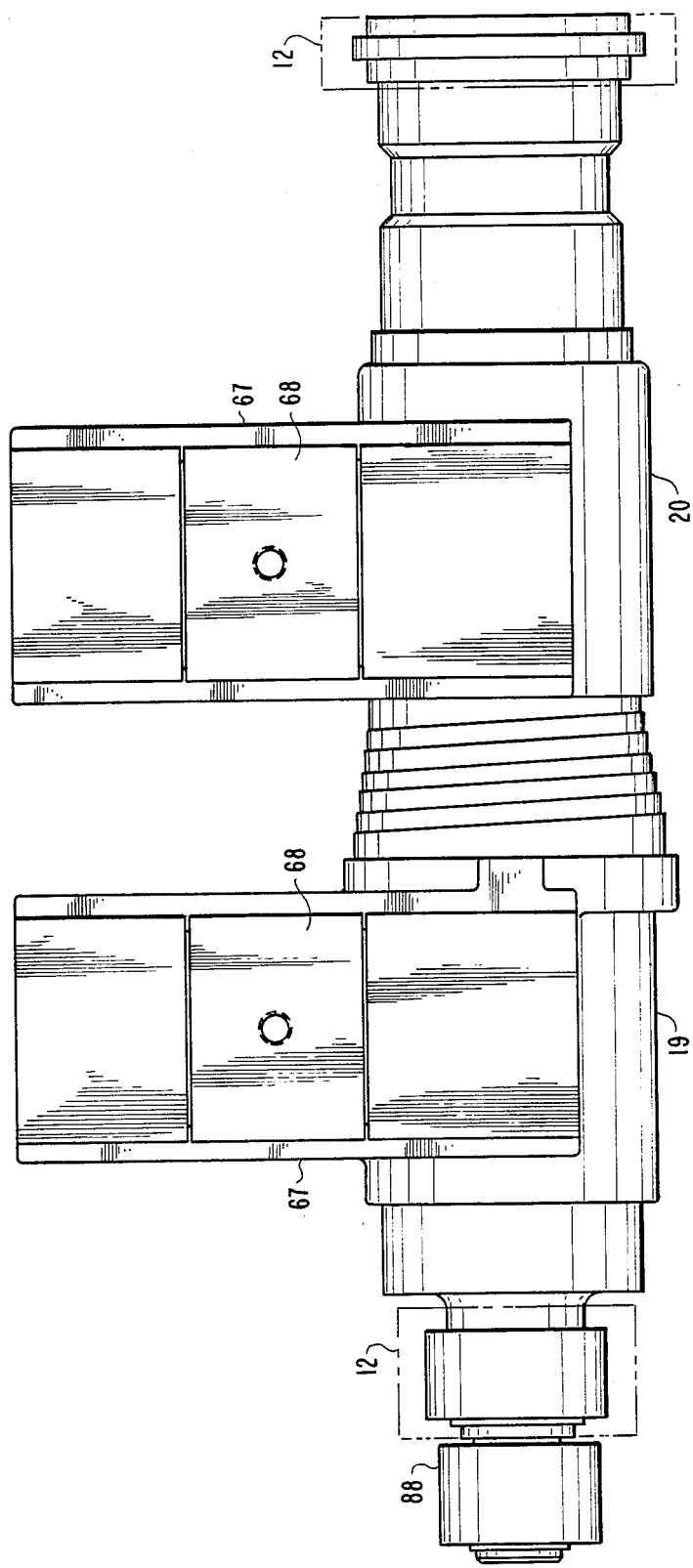
FIG. 4 is a side plan view of the invert/neckring mechanism of FIG. 1.

Arm holders 19 and 20 are single piece castings each having a support section 67 (FIGS. 2 and 4) to which a pair of neck mold holder arms (not shown) are attached in a conventional manner. Support sections 67 are each provided with a T-nut 68 along a medial portion which mates with a T-groove on the corresponding neck mold holder arm to provide a rigid connection therebetween. The neck mold holder arms in turn provide a mounting for a pair of neck ring halves (not shown) which face each other so that they can grip the neck portion of a parison. With arm holders 19 and 20 in the closed position, the neck ring halves are thus in a parison gripping position. With arm holders 19 and 20 in the open position, the neck ring halves are in the parison releasing position.

Arm holder 20 is biased toward the closed, parison gripping position at all times by a set of four coil springs 55. Springs 55 are preloaded in compression between arm holder 20 and combination flange 16 and are spaced centrally with respect to and equidistant from each of the four sides of shaft 17. (FIGS. 1 and 2). Anchoring each spring 55 to combination flange 16 is the head 57 of a socket head cap screw 58 which is set into combination flange 16. Each head 57 extends into the central region of its corresponding spring 55, keeping spring 55 aligned along its axis of compression. Referring to counterpart arm holder 19, a set of four screws 61 having heads 62 is set into stop 52 to keep aligned springs 63, springs 63 being compressively preloaded between arm holder 19 and stop 52. A set of four bores 65 in arm holder 20 receives the other end of each spring 55. The depth of each bore 65 is made long enough to accommodate the entire length of spring 55 in its compressed state.

With springs 55 constantly biasing arm holders 19 and 20 to the closed, parison gripping position, hydraulic cylinder assembly 22 controls the opening and closing of arm holders 19 and 20. Assembly 22 is centered relative to plane 5 and includes irregularly shaped cylinder body 70 to a pair of identical, mutually opposing pistons 71 and 72. Cylinder body 70 is rigidly fixed by screws 75 (FIG. 2) to shaft 17 with flat upper surface 74 of cylinder 70 mating with indented lower surface 76 of shaft 17. Cylinder body 70 defines pressure cylinder 77 which is open at both ends, is centered with respect to plane 5 and has a length equal to the combined length of abutting pistons 71 and 72 received therein. With arm holders 19 and 20 in the closed position, compressed by springs 55 and 63 against each other at surfaces 53, pistons 71 and 72 are also compressed against each other by arm holders 19 and 20 via flanges 40 and 41 and are centered within cylinder 70.

In order to introduce fluid under pressure into hydraulic cylinder assembly 22, shaft 17 is provided with axial bore 79, which extends only through one side of shaft 17, as shown in FIG. 1, and which communicates at one end with feed bore 83 and at its other end with radial bore 80. Radial bore 80 in turn communicates through port 81 of cylinder body 70 with cylinder 77. Seal 82 is provided at the interface between cylinder port 81 and radial bore 80 to prevent fluid leakage thereat. Mutually facing ends 84 and 85 of pistons 71 and 72 form a mutual stop for each other, and each has a reduced cross-section to create a minimum pressure volume when pistons 71 and 72 are together. Shaft 17 has a cylindrical exterior to the left of ledge 89, as shown in FIG. 1, to accommodate its mounting in frame 12 and to accommodate hydraulic swivel 88. Hydraulic swivel 88 fits snugly on the end of shaft 17 in sleeve-like fashion and is held thereon by retainer ring 91. Interior annular channel 93 of swivel 88 communicates with feed bore 83 through all 360° of rotation of swivel 88 about shaft 17. Radial inlet 94 communicates with annular channel 93 and is also connected with a conventional hydraulic pressure source to provide hydraulic fluid to invert/neckring mechanism 10. O-rings 90 seal annular channel 93 from leakage.

A telescoping coil spring 96 surrounds the inner portions of and is extended between arm holders 19 and 20 to protect the central portion of invert/neckring mechanism 10 from external debris. (FIGS. 1, 3 and 4) Spring 96 extends and contracts with arm holders 19 and 20 to protect the central portion of mechanism 10 at all times.

In accordance with the assembly described above, invert/neckring mechanism 10 operates as follows:

Arm holders 19 and 20 are moved and held to the closed position by the compressive force of springs 55 and 63. Arm holders 19 and 20 are moved axially to the open position by the introduction of pressurized hydraulic fluid to cylinder assembly 22. Fluid is admitted to mechanism 10 through swivel 88 and conducted through axial and radial bores 79 and 80 and into cylinder 77. Pistons 71 and 72 are thereby forced in opposite directions, their mutually opposed ends 86 and 87 pushing against flanges 40 and 41, which push arm holders 19 and 20 apart, the arm holders riding upon long and short shoes 30 and 39, respectively. Relief of fluid pressure from cylinder 77 allows springs 55 and 63 to bias arm holders 19 and 20 back to the closed position. The limited travel of arm holders 19 and 20 to the open position is adjustable by adjusting stud 98 and dual adjusting nuts 99.

The invert function of invert/neckring mechanism 10 is achieved through input rotation of hydraulic actuator assembly 15, which is rigidly attached to and in juxtaposition with shaft 17 via flange combination 16. One such hydraulic actuator assembly is a helical spline type which is commercially available from Helac Corp., 1462 Blake St., Enumclaw, Wash. 98022. Actuator assembly 15 oscillates through an invert arc of 180° to invert arm holders (and two conventional neck ring halves held by them) between a blank mold station and a blow mold station. Worm gear 101 meshes with a gear segment 102 on assembly 15 to provide adjustment of the invert arc. Rotational motion of actuator assembly 15 and shaft 17 is transmitted to arm holders 19 and 20 by means of the mating rectangular cross-sectional relationship between shaft 17 and central passage 24 of each arm holder 19 and 20.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. An invert and neckring mechanism for an I.S. glass forming machine, comprising:
    a frame;
    a horizontally disposed shaft supported by said frame for rotation through 180° degrees about the center line axis of said shaft;
    a pair of mutually opposing neckring arm holders mounted for rotation as a unit with said shaft and for axial movement away from and towards one another along said shaft;
    spring means for biasing said arm holders toward one another; and,
    piston means, located totally offset from the center line axis of said shaft, for urging said arm holders apart, said piston means disposed between said arm holders.

2. The invert and neckring mechanism of claim 1 wherein said piston means includes:
    a cylinder having walls and first and second open ends,
    a pair of mutually opposing pistons having mutually facing ends and mutually opposed ends, said pair of pistons disposed for axial movement within the cylinder, and
    a central pressure chamber defined by the mutually facing ends of said pair of pistons and by the walls of said cylinder.

3. The invert and neckring mechanism of claim 2 wherein said cylinder is located adjacent said shaft and is fixedly mounted relative to said shaft.

4. The invert and neckring mechanism of claim 2 wherein a wall of said cylinder defines a port therethrough and said shaft defines an internal bore providing fluid passageway means for delivering hydraulic fluid under pressure from a source away from the invert and neckring mechanism to said central pressure chamber, and said invert and neckring mechanism further includes a sealing means for sealing the flow of hydraulic fluid at the interface between said internal bore of said shaft and said cylinder port.

5. The invert and neckring mechanism of claim 4 wherein said shaft has a substantially rectangular cross-section mating along at least a portion of its length with a complimentary shaped central passage in each of said arm holders.

6. The invert and neckring mechanism of claim 2 wherein the mutually facing ends of said pair of pistons have a reduced cross-section.

7. The invert and neckring mechanism of claim 6 further including first and second positions, said first position defined by said arm holders being biased by said spring means into mutual central contact and by said pistons being biased together by said arm holder and spring means, and said second position defined by fluid pressured into said pressure chamber, said pistons spread apart from each other with the mutually opposed ends extending out of the first and second ends of said cylinder and urging said arm holders away from each other.

8. The invert and neckring mechanism of claim 1 wherein said spring means include at least two coil springs for each arm holder, said at least two coil springs each having an axis disposed exteriorly of and parallel to said shaft and wherein said at least two coil springs for each arm holder are mechanically connected in parallel.

9. An invert and neckring mechanism for an I.S. glass forming machine, comprising:
    a frame;
    a horizontally disposed shaft supported by said frame and adapted for 180° rotational oscillation about the centerline axis of said shaft;
    a pair of mutually opposing neckring arm holders mounted on said shaft for rotation as a unit with said shaft and for movement axially relative to said shaft;
    spring means biasing said arm holders together; and, hydraulic piston means externally mounted to and adjacent said shaft for urging said arm holders apart by reciprocating movement on an axis offset from the centerline axis of said shaft.

10. The invert and neckring mechanism of claim 9 wherein said hydraulic piston means includes:
   a cylinder having walls and first and second open ends,
   a pair of mutually opposing pistons having mutually facing ends, said pair of pistons disposed for axial movement within the cylinder, and
   a central pressure chamber defined by the mutually facing ends and by the walls of said cylinder.

11. The invert and neckring mechanism of claim 10 wherein said cylinder is rigidly mounted to said shaft between said arm holders.

12. The invert and neckring mechanism of claim 11 wherein said arm holders each include a central opening through which extends said shaft, said hydraulic piston means extending between said arm holders.

13. The invert and neckring mechanism of claim 12 wherein said arm holders move between closed and open positions, said closed position defined by said arm holders being biased towards one another by said spring means, and said open position defined by said arm holders being urged apart by said hydraulic piston means against the bias of said spring means.

14. The invert and neckring mechanism of claim 9 wherein said shaft has a substantially rectangular cross-section along a portion of its length.

15. The invert and neckring mechanism of claim 14 wherein each of said arm holders includes a central opening having a generally rectangular cross-section meshing with the rectangular cross-section of said shaft so that rotation of said shaft imparts rotational movement to said arm holders.

16. An invert and neckring mechanism for an I.S. glass forming machine, comprising:
   a frame;
   a horizontally disposed shaft supported by said frame and rotatable about the axis of rotation of said shaft, said shaft having sides forming a substantially quadrilateral cross-section along at least a portion of its length;
   a pair of mutually opposing neckring arm holders each having a central opening of quadrilateral cross-sectional shape receiving the portion of said shaft therein having the substantially quadrilateral cross-section and being sized to restrict movement of said arm holders relative to said shaft to an axial direction along said shaft;
   spring means for biasing said arm holders together; and,
   piston means for urging said arm holders apart, said piston means including at least one piston reciprocating on an axis located totally offset from the axis of rotation of said shaft.

17. The invert and neckring mechanism of claim 16 wherein said piston means is rigidly mounted to one of the side of said shaft and between said arm holders.

18. The invert and neckring mechanism of claim 17 wherein said piston means includes:
   a cylinder mounted rigidly to said shaft,
   a pair of opposing pistons slidably disposed within said cylinder for movement toward and away from one another within said cylinder,
   a pressure chamber defined by said pistons and said cylinder;
   said pistons moving mutually apart in response to increased fluid pressure within said pressure chamber.

19. The invert and neckring mechanism of claim 18 wherein said piston means is hydraulically actuated.

20. The invert and neckring mechanism of claim 19 wherein said shaft includes a passageway for delivery of hydraulic fluid from an outside hydraulic pressure source to said pressure chamber.

* * * * *

UNITED STATES PATENT AND TRADEMARK OFFICE
CERTIFICATE OF CORRECTION

PATENT NO. : 4,842,636

DATED : June 27, 1989

INVENTOR(S) : Harold C. Libert

It is certified that error appears in the above-identified patent and that said Letters Patent is hereby corrected as shown below:

In column 2, line 54, please change "generated" to --generally--.
In column 3, line 44 and line 48, please change "cylindrically" to --cylindrical--.
In column 4, line 37, please change "to" to --and--.
In column 5, line 63, please delete the word "degrees".
In column 6, line 35, please change "complimentary" to --complementary--.

Signed and Sealed this

Seventeenth Day of April, 1990

Attest:

HARRY F. MANBECK, JR.

Attesting Officer     Commissioner of Patents and Trademarks